US005263509A

United States Patent [19]

Cherry et al.

[11] Patent Number: 5,263,509

[45] Date of Patent: Nov. 23, 1993

[54] REFRIGERATOR WITH DOOR MOUNTED DISPENSER SUPPLY MECHANISM

[75] Inventors: David N. Cherry; Gary L. Haynes; Stephen P. Virgin, all of Louisville, Ky.

[73] Assignee: General Electric Company, Louisville, Ky.

[21] Appl. No.: 974,534

[22] Filed: Nov. 12, 1992

[51] Int. Cl.[5] .......... F16L 3/00

[52] U.S. Cl. .......... 137/343; 62/338; 62/339; 312/401

[58] Field of Search .......... 62/339, 338; 137/343, 137/899.1, 580; 312/401

[56] References Cited

U.S. PATENT DOCUMENTS

| | | | |
|---|---|---|---|
| 2,786,338 | 3/1957 | Wurtz et al. | 62/339 |
| 3,042,780 | 7/1962 | Gursahaney | 219/19 |
| 3,429,140 | 2/1969 | White | 62/339 |
| 3,788,094 | 1/1974 | Benasutti | 62/339 |
| 4,036,620 | 7/1977 | Benasutti et al. | 62/338 |
| 4,543,800 | 10/1985 | Mawby et al. | 62/339 |
| 4,912,942 | 4/1990 | Katterhenry et al. | 23/12 |

*Primary Examiner*—Michael Chambers
*Attorney, Agent, or Firm*—Radford M. Reams; H. Neil Houser

[57] ABSTRACT

The utility conduits (electric conductors and water conduit) of a door mounted dispenser are conducted from below the cabinet to the inside of the door through an inflexible tube. One section of tube rests on a shelf under the refrigerator cabinet and a second section of the tube projects into the bottom of the door in free-standing relationship to the door. The lengths of the tube sections assure that the second section stays in the door without the need of any mechanical connection between the tube and door.

10 Claims, 2 Drawing Sheets

REFRIGERATOR WITH DOOR MOUNTED DISPENSER SUPPLY MECHANISM

BACKGROUND OF THE INVENTION

This invention relates to refrigerators, and more particularly to an improved mechanism for supporting the conduits supplying utilities to a door mounted dispenser.

For many years refrigerators, particularly refrigerator/freezer type refrigerators, have included door mounted dispensing mechanisms. In most such refrigerators the conduits to carry electric power and water to the dispenser were routed through the hinge mounting the door to the cabinet. This obviated the need for the conduits to travel in a longitudinal direction and simplified any problems as the door rotated about the hinge through which the conduits were directed. U.S. Pat. Nos. 3,089,202-Pulaski; 3,429,140-White and 4,543,800-Mawby et al disclose refrigerators with various mechanisms for directing electric conductors and/or water conduits through the door hinge.

More recently some refrigerator have included "outboard" hinges, in which the pivot point is outside the cross sectional area of the door. This enables the user to mount the refrigerator with its front even with adjacent cabinets and still fully open the door, even if there is a thick decorative trim on the front of the door. However, utility conduits cannot be directed through the hinge pin as it is outside the door. U.S. Pat. No. 4,912,942-Katterhenry et al describes one mechanism for carrying the utility conduits to such a door. The Katterhenry mechanism is time consuming and unwieldy to assemble as one end of its tube must be threaded through a small guide opening provided on the cabinet and the other end of the tube must be rotatably joined to a fitting provided on the door.

The present invention is intended to overcome one or more of the problems of the prior art.

It is an object of the present invention to provide a refrigerator with an improved mechanism for carrying dispenser utility conduits to the door.

It is another object of the present invention to provide such a mechanism that is simple and easy to install and does not require a joint or mechanical connection with the door.

SUMMARY OF THE INVENTION

In accordance with one embodiment of the present invention, a refrigerator includes a cabinet defining a refrigerated compartment and a door hinged to the cabinet to close the compartment. A dispenser is mounted in the door. A mechanism to supply utilities, such as electricity and water to the dispenser, includes a shelf mounted below the cabinet and a substantially inflexible tube. The tube includes a first elongated portion which rests on the shelf and a second portion perpendicular to the first portion. The second portion projects through the bottom of the door and has a free-standing rotatable relationship with the door. Electric conductors and a water conduit extend through the tube. The lengths of the tube portions are sufficient to assure that the tube remains in the door independent of any connection to the door.

In accordance with a further aspect of the invention, the cabinet has a support structure including an elongated channel projecting below the bottom edge of the cabinet. The shelf projects under the cabinet from the channel and a right angled flange joins front portions of the channel and shelf to form a guide tunnel for the tube.

In accordance with yet another aspect of the invention, a nipple is mounted in the opening in the bottom of the door and the second portion of the tube has a free-standing rotatable relationship to the nipple.

DESCRIPTION OF THE PREFERRED EMBODIMENTS

Figures 1, 2, 3, 4:
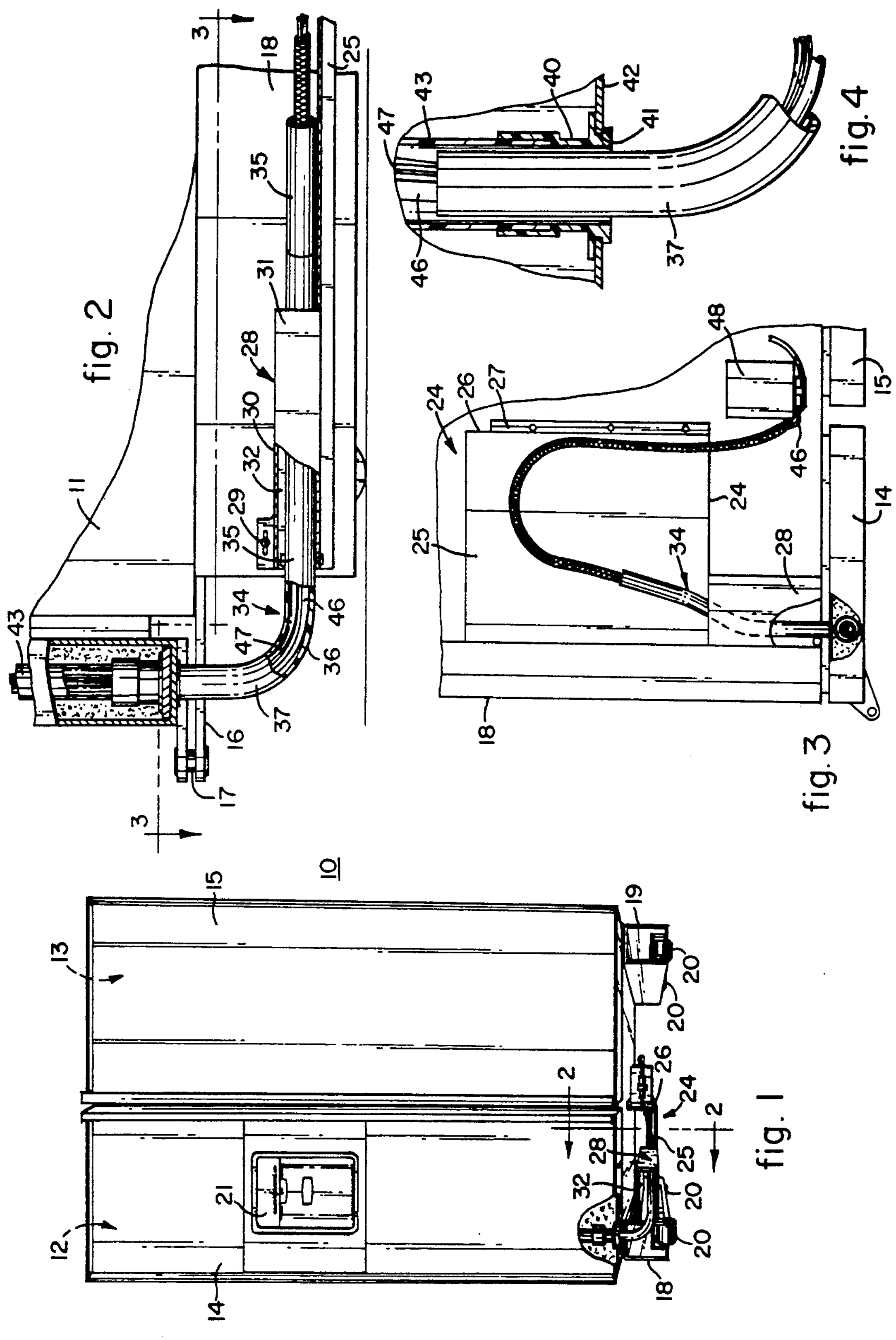
FIG. 1 is a front elevational view of a side-by-side refrigerator/freezer cabinet structure incorporating one form of the present invention and with a portion of the freezer door broken away for purposes, of illustration.
FIG. 2 is a simplified vertical section view taken along line 2—2 in FIG. 1.
FIG. 3 is a simplified horizontal section view taken along line 3—3 in FIG. 2.
FIG. 4 is an enlarged vertical section view of the portion of the interior of the freezer door shown in the broken away portion of FIG. 1.

While the invention is applicable to any refrigerator in which ice, water (or other liquid) or both ice and water are dispensed through the door, it will be described in relationship to a side-by-side refrigerator/-freezer type of refrigerator. Referring to the drawings, and particularly to FIG. 1, a refrigerator/freezer type refrigerator 10 includes a cabinet 11 defining separate vertically extending freezer 12 and fresh food 13 compartments, as is well known in the art. Doors 14 and 15 are rotatably mounted on the cabinet by hinges such as 16 to selectively open and close the compartments 12 and 13 respectively. It will be noted that the hinge 16 is an "outboard" hinge, that is the pivot pin is outside the outer edge or periphery of the cabinet and door. The cabinet is mounted on a floor or other surface by elongated support channels 18 and 19 which project downwardly from the bottom of the cabinet 11 and extend along its lateral edges. The channels mount rollers 20 to simplify moving the cabinet. As is well known in the art, refrigerators include numerous other components such as, for example, a sealed refrigerant system. Such components are not part of the present invention and have been omitted for the sake of simplicity and clarity.

A dispenser or dispensing mechanism 21 is mounted in the door 12. Since the pivot pin 17 is outside the door, conduits for utilities, such as water and electricity, cannot be introduced into the door through the pivot pin.

Referring particularly to FIGS. 2 and 3, a shelf 24 includes a bottom or horizontal portion 25 and a vertical end portion 26. The bottom portion is mounted to the support channel 18 by some suitable means such as screws, not shown, and the end portion 25 is similarly mounted to the under side of the cabinet 11 using the flange 27. In this way the bottom portion 25 provides a large, flat area projecting under the cabinet 11 from the channel 18. A right angled flange 28 is secured to the front portion of the channel 18 by screws 29. The flange includes a top portion overlying the shelf bottom 25 and an end portion 3 which extends downwardly and engages the shelf bottom 25. Thus, the flange 28, together with the corresponding portions of the support channel 18 and shelf 24, define a guidance tunnel 32.

A hollow, elongated substantially inflexible tube 34 is mounted with an elongated, horizontal first portion 35 projecting through the tunnel 32 and supported o the bottom portion 25 of the shelf 24. The tube includes a substantially right angled bend 36 so that a second elongated portion 37 is perpendicular to the first portion 35 and projects into the bottom of the door 14.

More specifically, and viewing particularly FIGS. 2 and 4, a hollow nipple 40 is mounted in an opening 41 formed in the bottom wall 42 of the door 12, a pipe or conduit 43 connects the nipple to the dispenser 21. The second portion 37 of the tube 34 extends well into the door 12 and may extend through the nipple 40 into the pipe 43. The outside diameter of the tube is smaller than the inside diameter of the nipple 40 and pipe 43 so that the portion 37 of the tube has a free-standing rotatable relationship to the nipple and pipe, and thus to the door. At the same time, the tube is not mechanically connected to the door.

Utility conduits, such as a flexible water conduit 46 and electric conductors 47 extend from the dispenser 2 through the pipe 43 and tube 34. The other end of the water conduit 46 is connected to a water valve mechanism 48, mounted under the cabinet 11, and the electric conductors are connected to appropriate electric terminals, not shown. A flexible braided sleeve 50 is connected to the distal end of first tube portion 35 and covers the remaining portions of the utility conduits overlying the shelf 24.

Figure 7:
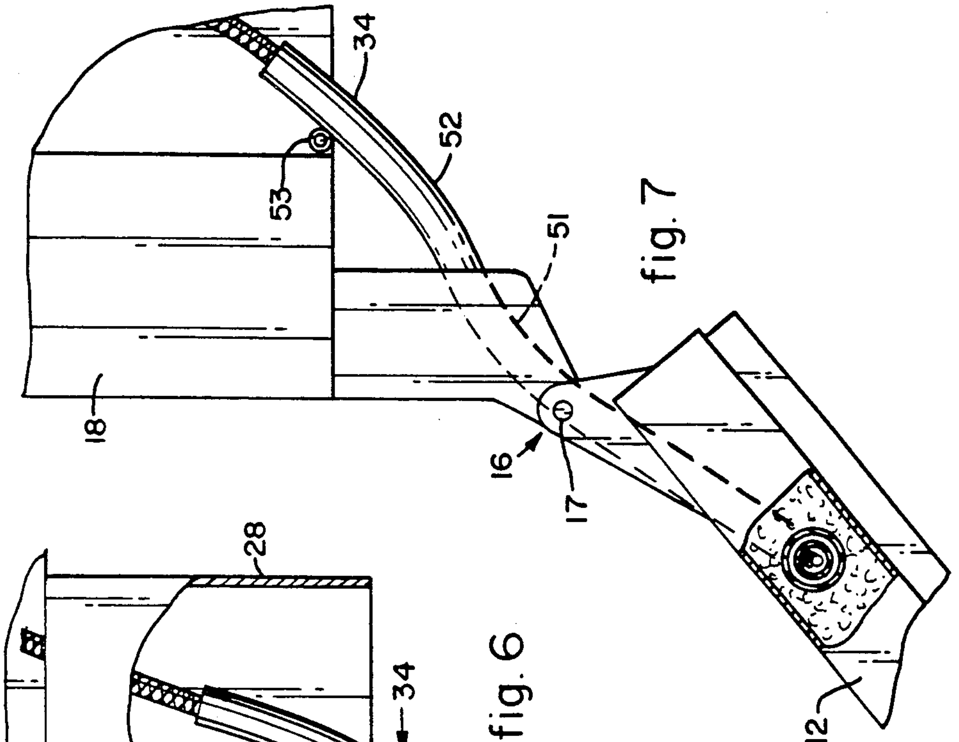
FIG. 7 is a simplified plan view similar to FIG. 5, showing the door in its fully open position.
Figure 6:
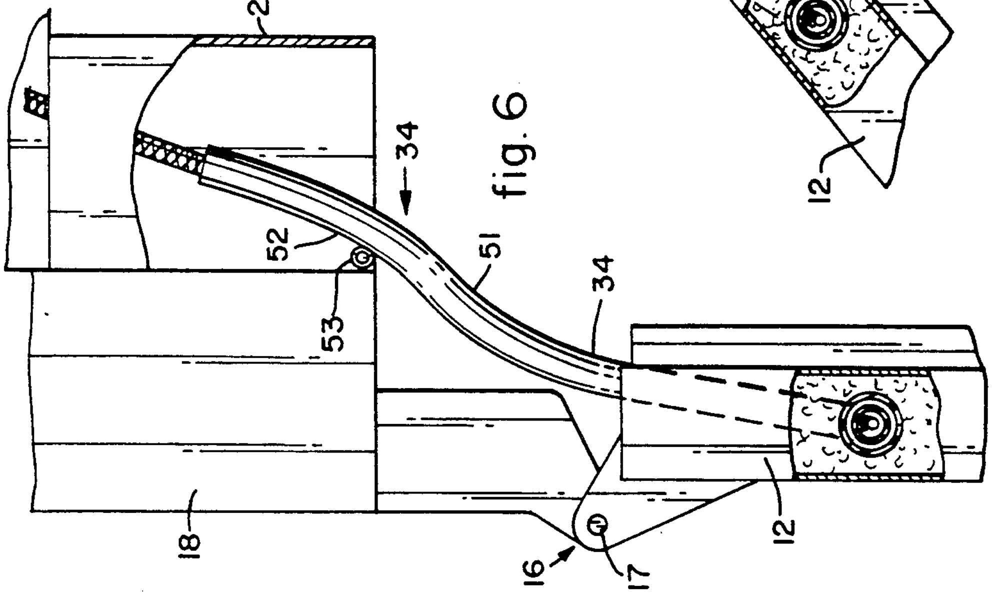
FIG. 6 is a simplified plan view like FIG. 5, showing the door at right angles to the cabinet.
Figure 5:
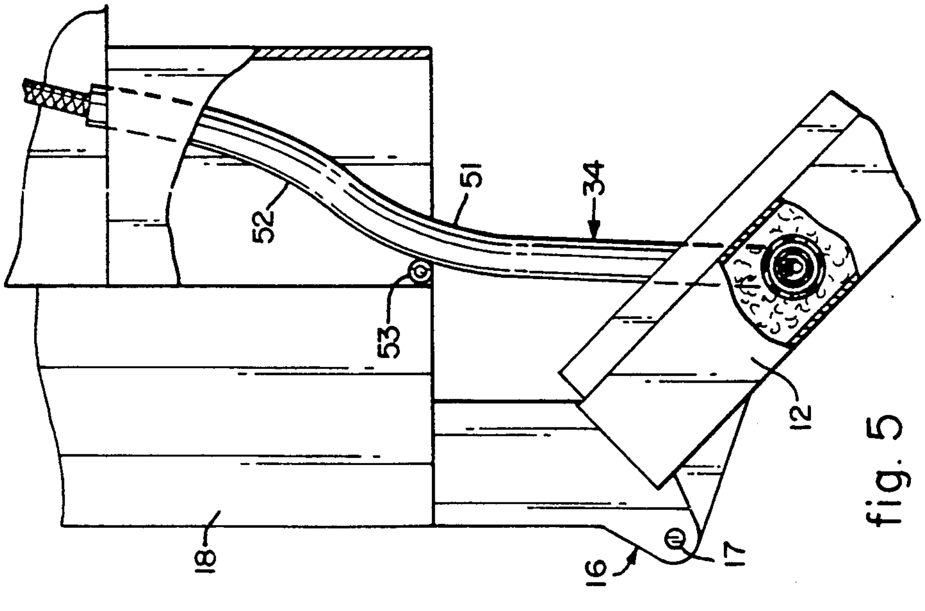
FIG. 5 is a simplified plan view, similar to FIG. 2, showing the door slightly ajar.

Referring now more particularly to FIGS. 3 and 5–7, it will be seen that the first tube portion is bent at 51 and 52 so that it easily moves within the tunnel 32 as the door is opened and closed (that is moves from the position of FIG. 3 through those of FIGS. 5 and 6 to that of FIG. 7 and back). If desired, a pin or roller 53 may be mounted to extend vertically through the tunnel 32 adjacent the front of the support channel 18. This will preclude any possibility of the edge of the channel 18 wearing away the tube. It will be seen in FIG. 7 that the first portion 35 of tube 34 substantially overlaps the bottom 25 of shelf 24 when the door is in its fully open position and the tube is correspondingly in its most extracted position. This, coupled with the significant projection of tube portion 37 into the lower portion of door 12, assures that the tube will remain in the door without the need of any connection or joint between them.

We claim:

1. In a refrigerator including a cabinet defining a refrigerated compartment, a door hingedly mounted to the cabinet to selectively close the compartment, the door including dispensing means; a supply mechanism for the dispensing means including:

a shelf mounted below the cabinet;

the door including a bottom opening spaced from the hinged mounting of the door to the cabinet;

a hollow nipple mounted in the opening;

a substantially inflexible tube including a first elongated portion supported on said shelf for sliding movement relative thereto and a second portion disposed generally perpendicular to said first portion ad projecting into the bottom of the door through the opening in free-standing rotatable relationship to the door; and flexible utility conduit means extending through said tube and operatively connected to the dispensing means.

2. A supply mechanism as set forth in claim 1 wherein; said first tube portion is sufficiently long and said second tube portion projects sufficiently far into the door to assure retention of said second portion within the door independent of any connection to the door.

3. A supply mechanism as set forth in claim 1, further including: means, including at least a portion of said shelf, defining a guide tunnel for said tube.

4. A refrigerator, including:

a cabinet defining at least one refrigerated compartment;

a door hingedly mounted to said cabinet to selectively close said refrigerated compartment, said door including a bottom opening spaced laterally from the hinged mount of said door to said cabinet;

dispensing means provided in said door;

cabinet support means including an elongated channel structure projecting below said cabinet along its lateral edge adjacent the hinged mount of said door;

a shelf projecting under said cabinet from said channel structure;

a substantially inflexible tube including a first elongate portion slidably supported on said shelf and a second portion disposed generally perpendicular to said first portion and projecting into the bottom opening of said door in a free standing rotatable relationship to said door so that said first elongated portion slides relative to said shelf and said second portion rotates relative to said door as said door is moved between its open and closed positions; and flexible utility conduit means extending through said tube and operatively connected to said dispensing means.

5. A refrigerator as set forth in claim 4, wherein: the lengths of said first and second tube portions are sufficient to assure that said second portion remains in said door independent of any connection to said door.

6. A refrigerator as set forth in claim 4, further including: a right angled flange mounted against front portions of said channel structure and said shelf to form a guide tunnel for said tube.

7. A refrigerator as set forth in claim 4, wherein: the bottom of said door includes an opening and a hollow nipple is mounted in said opening; said second portion of said tube extends through said nipple in free-standing spaced relationship thereto.

8. A refrigerator as set forth in claim 4, wherein: said flexible conduit means includes at least one electric conductor.

9. A refrigerator as set forth in claim 4, wherein: said flexible conduit means includes a water supply conduit.

10. A refrigerator as set forth in claim 4, wherein: said flexible conduit means includes a water conduit and at least one electric conductor.

* * * * *